(12) United States Patent
Zhao et al.

(10) Patent No.: US 12,432,346 B2
(45) Date of Patent: Sep. 30, 2025

(54) INTRA PREDICTION MODE DERIVATION FOR CODING BLOCKS

(71) Applicant: Tencent America LLC, Palo Alto, CA (US)

(72) Inventors: Xin Zhao, San Jose, CA (US); Xiaozhong Xu, State College, PA (US); Lien-Fei Chen, Hsinchu (TW); Roman Chernyak, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 90 days.

(21) Appl. No.: 18/407,090

(22) Filed: Jan. 8, 2024

(65) Prior Publication Data

US 2024/0236321 A1 Jul. 11, 2024

Related U.S. Application Data

(60) Provisional application No. 63/437,972, filed on Jan. 9, 2023.

(51) Int. Cl.
*H04N 19/12* (2014.01)
*H04N 19/159* (2014.01)
*H04N 19/176* (2014.01)
*H04N 19/513* (2014.01)

(52) U.S. Cl.
CPC .......... *H04N 19/12* (2014.11); *H04N 19/159* (2014.11); *H04N 19/176* (2014.11); *H04N 19/521* (2014.11)

(58) Field of Classification Search
CPC .... H04N 19/12; H04N 19/159; H04N 19/176; H04N 19/521; H04N 19/11; H04N 19/593
See application file for complete search history.

(56) References Cited

U.S. PATENT DOCUMENTS

2018/0152727 A1* 5/2018 Chuang ................. H04N 19/70

OTHER PUBLICATIONS

C. Muhammed, et al., Algorithm description of Enhanced Compression Model 7 (ECM 7), Joint Video Experts Team (JVET) of ITU-T SG 16 WP 3 and ISO/IEC JTC 1/SC 29 28th Meeting, Mainz, DE, Oct. 20-28, 2022, Document: JVET-AB2025, pp. 1-62.

* cited by examiner

*Primary Examiner* — Nam D Pham
(74) *Attorney, Agent, or Firm* — ArentFox Schiff LLP

(57) ABSTRACT

Aspects of the disclosure include methods and an apparatus for video coding. The apparatus includes processing circuitry that receives coded information of a current block in a current picture. The current block is coded with a first intra prediction mode that is different from a plurality of intra prediction modes including a DC mode, a Planar mode, and angular intra prediction modes. A candidate block in the current picture coded by an intra prediction mode different from the plurality of intra prediction modes is selected. If the candidate block is located within a pre-defined region, a second intra prediction mode is derived from the plurality of intra prediction modes for the candidate block. The second intra prediction mode is associated with the current block and is used to select a transform for the current block and/or to construct a most probable mode (MPM) list for another block.

20 Claims, 15 Drawing Sheets

Table 2: Mapping of intra prediction modes to LFNST set index

| Intra pred. mode | -14 | -13 | -12 | -11 | -10 | -9 | -8 | -7 | -6 | -5 | -4 | -3 | -2 | -1 | 0 | 1 |
|---|---|---|---|---|---|---|---|---|---|---|---|---|---|---|---|---|
| LFNST set index | 2 | 2 | 2 | 2 | 2 | 2 | 2 | 2 | 2 | 2 | 2 | 2 | 2 | 2 | 0 | 1 |
| Intra pred. mode | 2 | 3 | 4 | 5 | 6 | 7 | 8 | 9 | 10 | 11 | 12 | 13 | 14 | 15 | 16 | 17 |
| LFNST set index | 2 | 3 | 4 | 5 | 6 | 7 | 8 | 9 | 10 | 11 | 12 | 13 | 14 | 15 | 16 | 17 |
| Intra pred. mode | 18 | 19 | 20 | 21 | 22 | 23 | 24 | 25 | 26 | 27 | 28 | 29 | 30 | 31 | 32 | 33 |
| LFNST set index | 18 | 19 | 20 | 21 | 22 | 23 | 24 | 25 | 26 | 27 | 28 | 29 | 30 | 31 | 32 | 33 |
| Intra pred. mode | 34 | 35 | 36 | 37 | 38 | 39 | 40 | 41 | 42 | 43 | 44 | 45 | 46 | 47 | 48 | 49 |
| LFNST set index | 34 | 33 | 32 | 31 | 30 | 29 | 28 | 27 | 26 | 25 | 24 | 23 | 22 | 21 | 20 | 19 |
| Intra pred. mode | 50 | 51 | 52 | 53 | 54 | 55 | 56 | 57 | 58 | 59 | 60 | 61 | 62 | 63 | 64 | 65 |
| LFNST set index | 18 | 17 | 16 | 15 | 14 | 13 | 12 | 11 | 10 | 9 | 8 | 7 | 6 | 5 | 4 | 3 |
| Intra pred. mode | 66 | 67 | 68 | 69 | 70 | 71 | 72 | 73 | 74 | 75 | 76 | 77 | 78 | 79 | 80 | |
| LFNST set index | 2 | 2 | 2 | 2 | 2 | 2 | 2 | 2 | 2 | 2 | 2 | 2 | 2 | 2 | 2 | |

FIG. 9

INTRA PREDICTION MODE DERIVATION FOR CODING BLOCKS

INCORPORATION BY REFERENCE

The present application claims the benefit of priority to U.S. Provisional Application No. 63/437,972, "Intra Prediction Mode Derivation for Coding Blocks Coded by Unconventional Intra Prediction Mode" filed on Jan. 9, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives coded information of a current block in a current picture. The current block is coded with a first intra prediction mode that is different from a plurality of intra prediction modes including a DC mode, a Planar mode, and angular intra prediction modes. The processing circuitry selects a candidate block in the current picture coded by an intra prediction mode different from the plurality of intra prediction modes. If the candidate block is located within a pre-defined region, the processing circuitry derives a second intra prediction mode from the plurality of intra prediction modes for the candidate block. The second intra prediction mode is associated with the current block. The processing circuitry performs at least one of: (i) selecting a transform for the current block based on the second intra prediction mode associated with the current block and reconstructing the current block according to the selected transform, or (ii) constructing a most probable mode (MPM) list for another block using the derived second intra prediction mode associated with the current block.

In an example, the other block is a neighboring block of the current block.

In an example, the pre-defined region includes one or more of (i) a current coding tree unit (CTU) and (ii) at least one previously coded CTU.

In an example, the pre-defined region is updated for a block that is coded after the current block is coded.

In an example, a size of an area of the pre-defined region is fixed.

In an example, the processing circuitry stores the derived second intra prediction mode in a buffer of the current picture. When the current picture is a reference picture of another picture, the processing circuitry constructs the MPM list for the other block in the other picture using the stored second intra prediction mode.

In an example, the processing circuitry stores the derived second intra prediction mode in units of M×N. M and N can be positive integers.

In an example, the processing circuitry selects the transform that is a secondary transform, and a primary transform type is not selected based on the derived second intra prediction mode.

In an example, the first intra prediction mode is one of an intra block copy (IBC) mode, an intra template matching (IntraTMP) mode, a Matrix-based intra prediction (MIP) mode, and a Palette mode.

In an aspect, the current block is coded with one of the IBC mode and the IntraTMP mode. The processing circuitry derives a second intra prediction mode associated with the current block from a plurality of intra prediction modes including a DC mode, a Planar mode, and angular intra prediction modes by (i) checking at least one candidate block position in a pre-defined order and (ii) determining the second intra prediction mode associated with the current block according to an intra prediction mode that is associated with one of the at least one candidate block position. The at least one candidate block position can be associated with a reference block that is indicated by a block vector (BV) associated with the one of the IBC mode and the IntraTMP mode.

In an example, when a first one of the at least one candidate block position does not have an associated intra prediction mode that is one of the plurality of intra prediction modes, the processing circuitry skips the first one of the at least one candidate block position. For example, when the first one of the at least one candidate block position is located outside a pre-defined region (e.g., the pre-defined region described above), the first one of the at least one candidate block position does not have the associated intra prediction mode that is one of the plurality of intra prediction modes.

In an example, if a first one of the at least one candidate block position is located outside a pre-defined region, the processing circuitry replaces the first one of the at least one candidate block position with a position inside the pre-defined region.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 9 shows an exemplary mapping from intra prediction modes to secondary transform sets according to an aspect of the disclosure.

DETAILED DESCRIPTION OF ASPECTS

Figure 1:
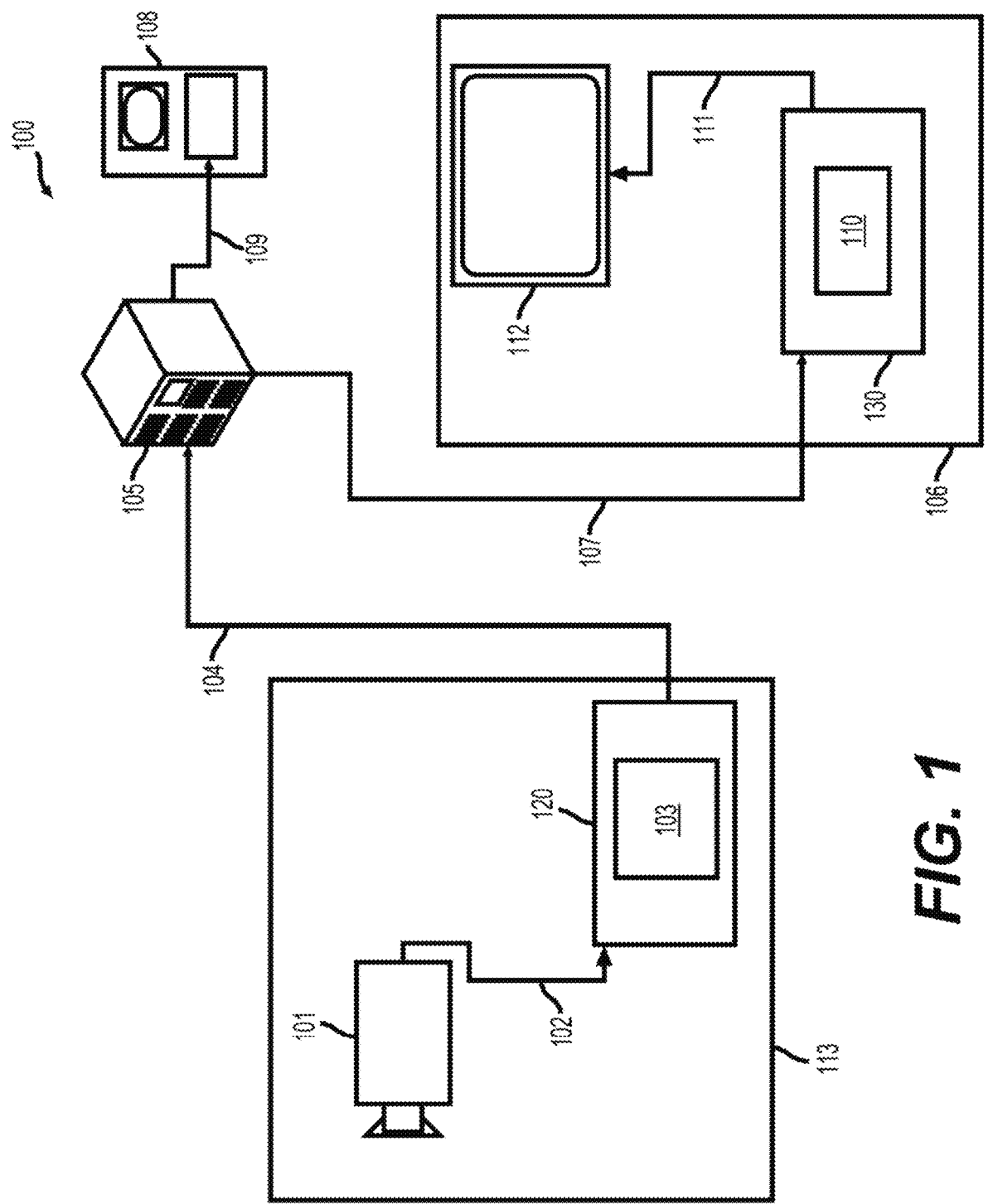
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
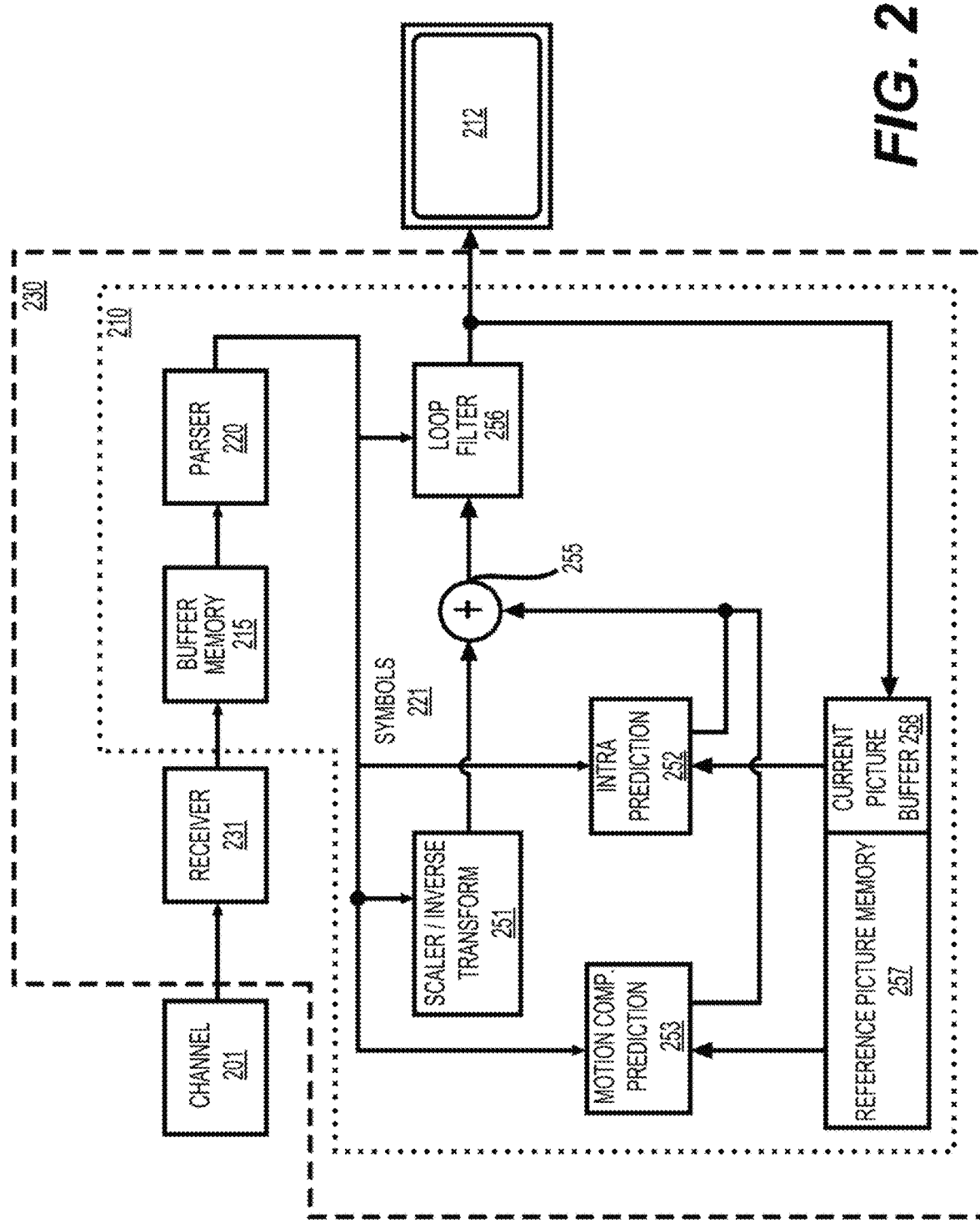
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
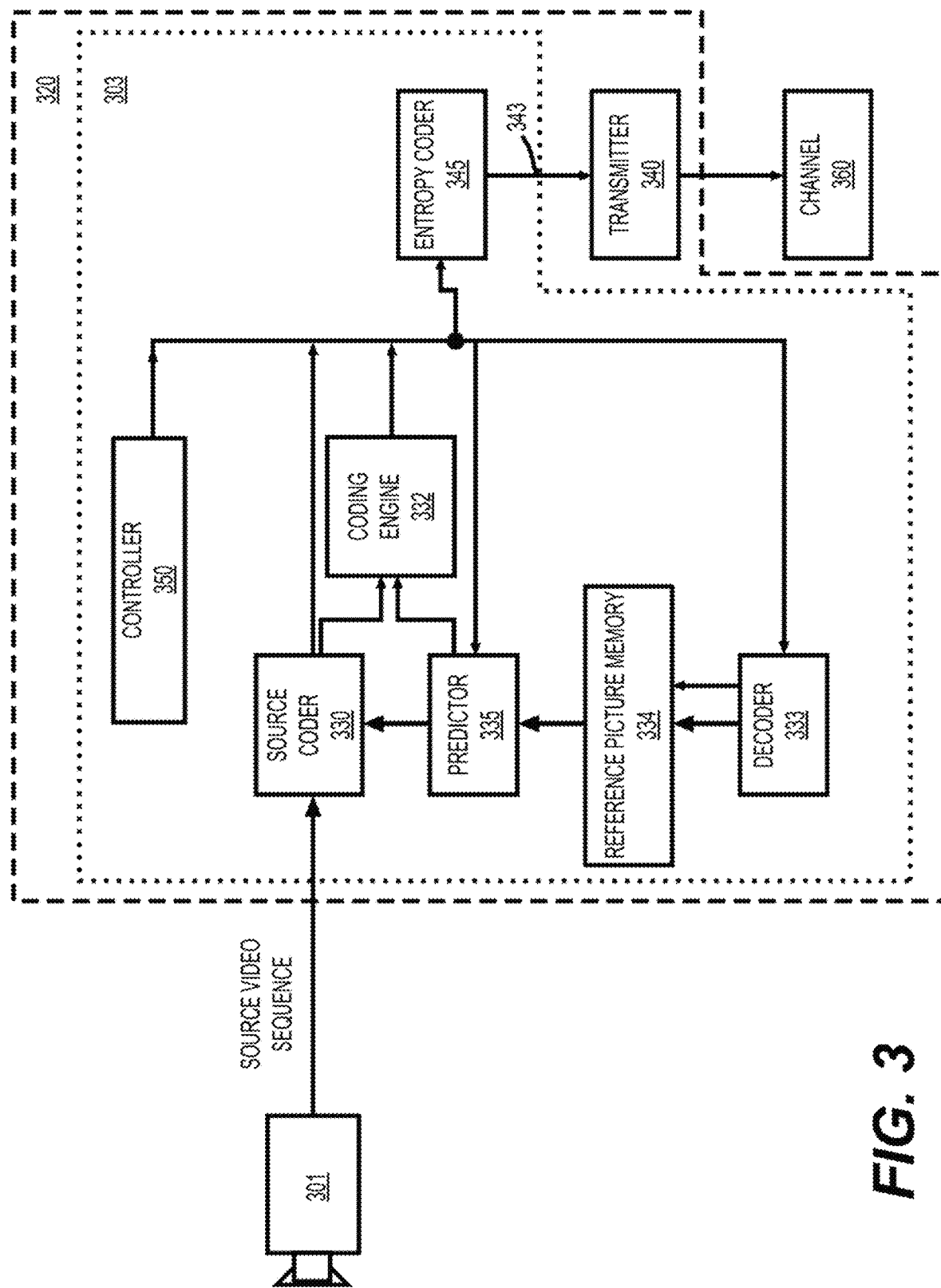
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Figure 4:
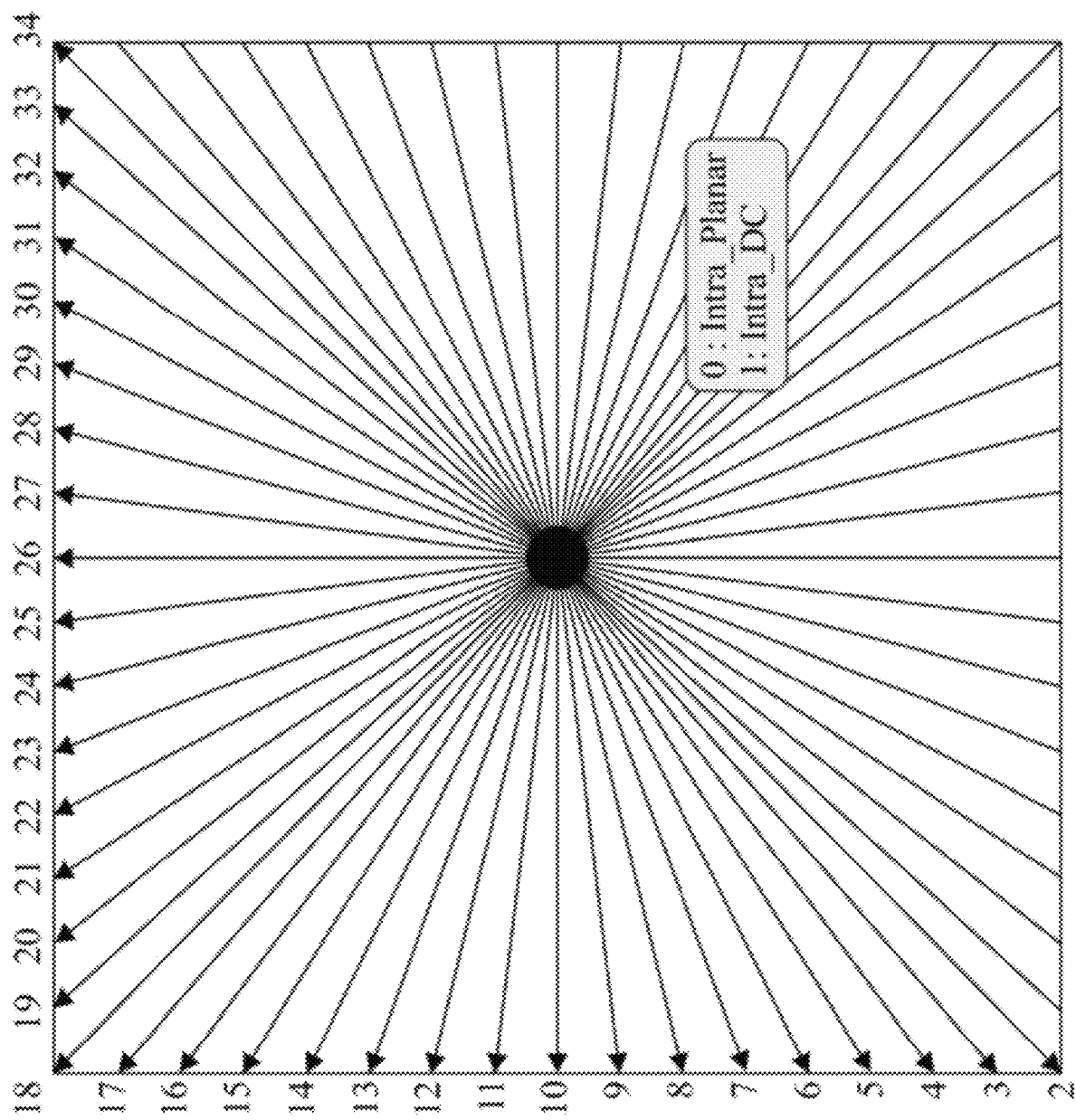
FIG. 4 shows intra prediction modes (e.g., 35 intra prediction modes such as used in HEVC) according to an aspect of the disclosure.

Various intra prediction modes for intra prediction can be used in video coding such as in HEVC and VVC. FIG. 4 shows intra prediction modes (e.g., 35 intra prediction modes such as used in HEVC) according to an aspect of the disclosure. In an example, such as in HEVC, there are 35 intra prediction modes (e.g., a total of 35 intra prediction modes). Referring to FIG. 4, among the 35 intra prediction modes, a mode 0 is a Planar mode (e.g., Intra_Planar), a mode 1 is a DC mode (e.g., Intra_DC), a mode 10 is a horizontal mode, a mode 26 is a vertical mode, and a mode 2, a mode 18, and mode 34 are diagonal modes. The planar mode can also be referred to as the planar intra prediction mode. In the example shown in FIG. 4, the intra prediction modes include angular intra prediction modes (e.g., the modes 2-34) and non-angular intra prediction modes (e.g., the modes 0-1). The intra prediction modes can be signaled by three most probable modes (MPMs) and 32 remaining modes.

Figure 5:
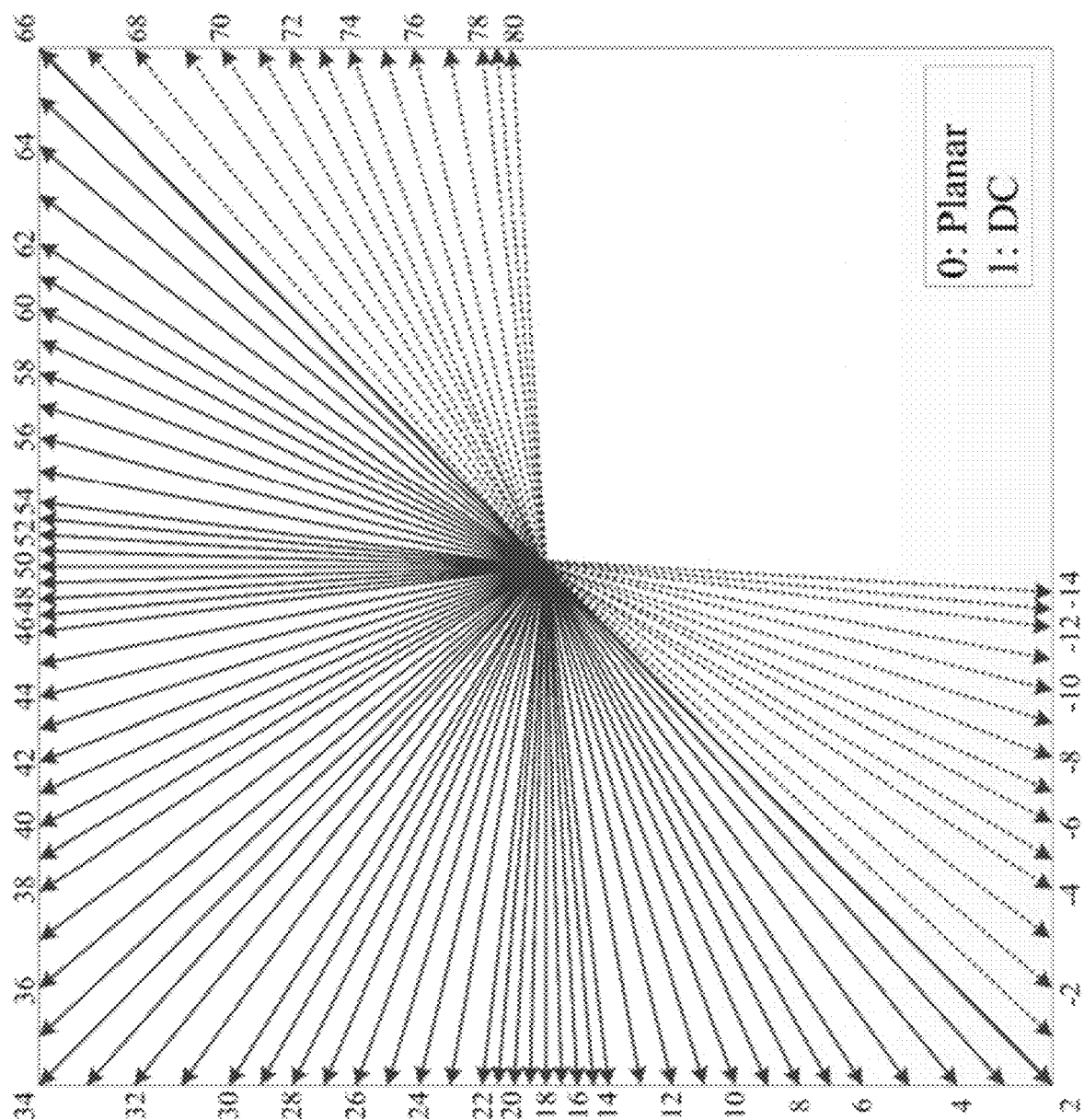
FIG. 5 shows intra prediction modes according to an aspect of the disclosure.

FIG. 5 shows intra prediction modes, such as intra prediction modes defined in VVC, according to an aspect of the disclosure. Referring to FIG. 5, in an example of VVC, there are 95 intra prediction modes (e.g., a total of 95 intra prediction modes). In an example, the 95 intra prediction modes are indicated by modes −14 to 80. For example, the mode 18 is a horizontal mode, the mode 50 is a vertical mode, and the mode 2, the mode 34 and the mode 66 are diagonal modes. Modes −1~−14 and Modes 67~80 can be called Wide-Angle Intra Prediction (WAIP) modes. In the example shown in FIG. 5, the intra prediction modes include angular intra prediction modes (e.g., the modes −14 to −1 and from 2 to 80) and non-angular intra prediction modes (e.g., the modes 0-1). The mode 0 is the Planar mode, and the mode 1 is the DC mode.

Examples of an intra block copy mode (also referred to as an IntraBC mode or an IBC mode), such as used in HEVC and VVC, are described below.

Figure 6:
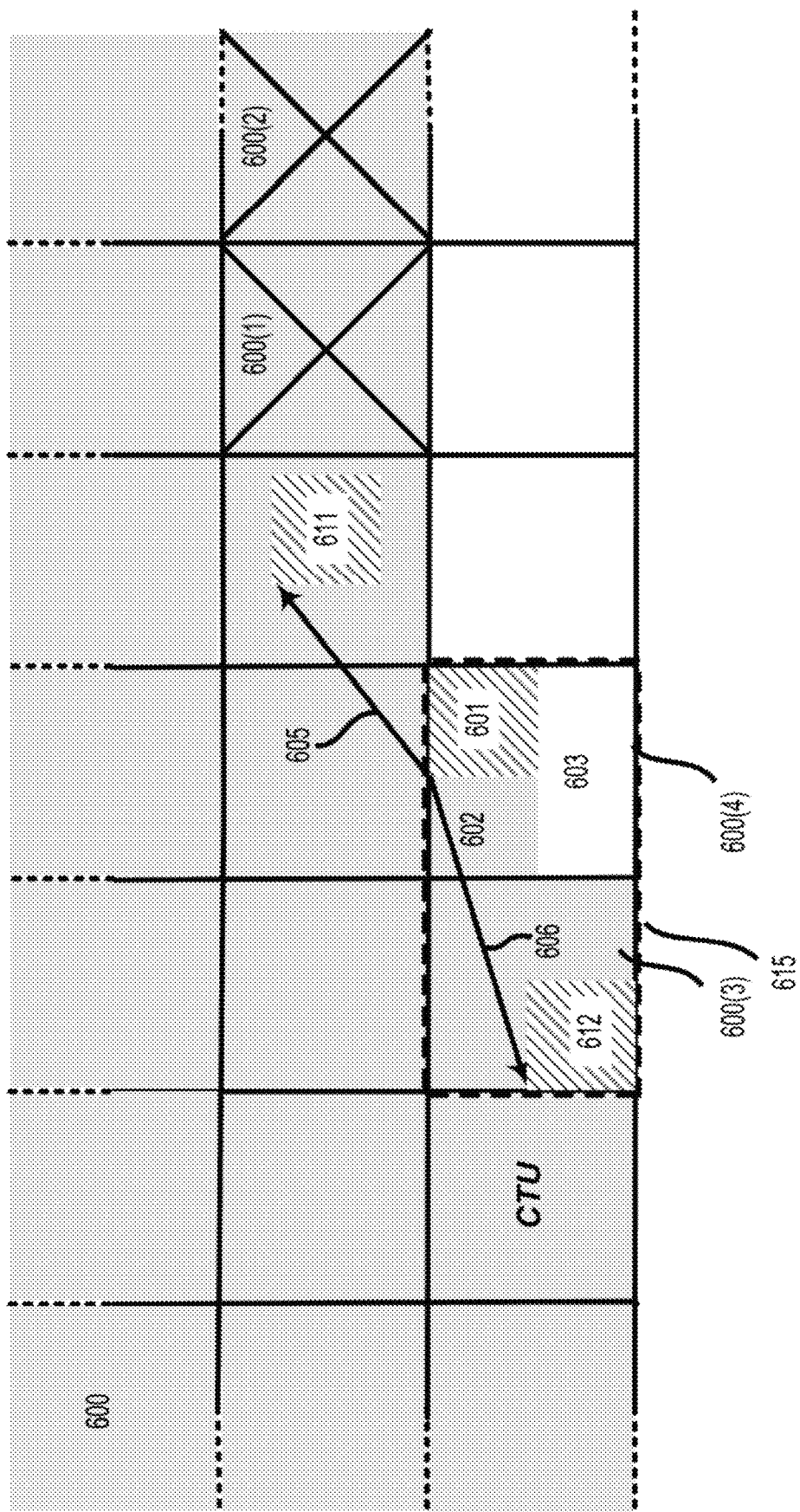
FIG. 6 shows examples of an intra block copy (IBC) mode according to examples of the disclosure.

FIG. 6 shows examples of the IBC mode according to examples of the disclosure. A reference block used to predict a current CU (601) can be indicated by a block vector (BV) associated with the current CU (601). Each square (600) can represent a CTU. A gray-shaded area represents an already coded area or an already coded region, and a white, non-shaded area represents an area or a region to be coded. A current CTU (600(6)) that is under reconstruction includes the current CU (601), a coded area (602), and an area (603) to be coded. In an example, the area (603) will be coded after coding the current CU (601).

In an example, such as in HEVC, the gray-shaded area except for the two CTUs (600(1)-400(2)) that are on the right above the current CTU (600(6)) can be used as a reference area in the IBC mode to allow a Wavefront Parallel Processing (WPP). A BV that is allowed in HEVC can point to a block that is within the reference area (e.g., the gray-shaded area excluding the two CTUs (600(1)-400(2))). For example, a BV (605) that is allowed in HEVC points to a reference block (611).

In an example, such as in VVC, in addition to the current CTU (600(6)), only a left neighboring CTU (600(3)) to the left of the current CTU (600(6)) is allowed as a reference area in the IBC mode. In an example, the reference area used in the IBC mode in VVC is within a dotted area (615) and includes samples that are coded. For example, a BV (606) that is allowed in VVC points to a reference block (612).

In BV coding of the IBC mode, referencing to a reconstructed area can be performed via a 2D BV which is similar to an MV used in the inter prediction. Prediction and coding of a BV can reuse MV prediction and coding in the inter prediction process. In some examples, a luma BV is in an integer resolution rather than a ¼-th (or ¼-pel) precision of a MV as used for a regular inter coded CTU.

Figure 7:
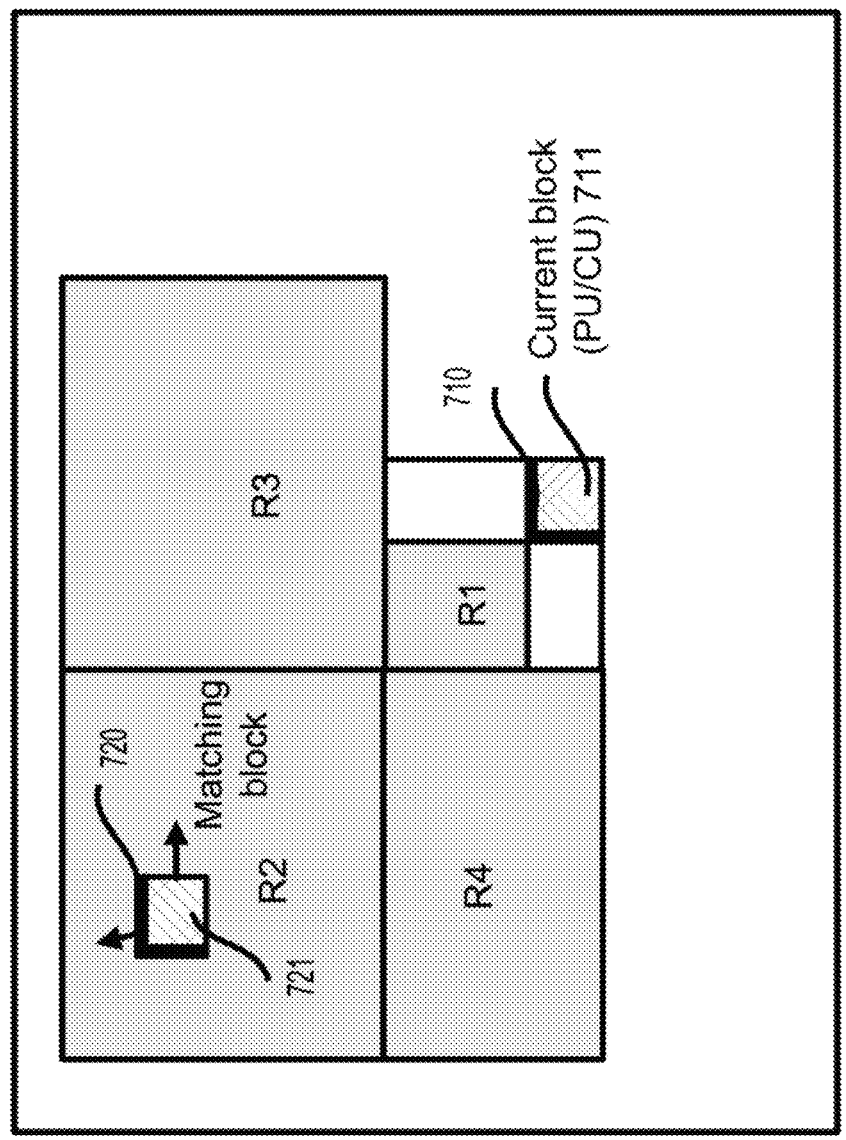
FIG. 7 shows an example of an intra template matching prediction (IntraTMP) mode according to an aspect of the disclosure.

FIG. 7 shows an example of an intra template matching prediction (IntraTMP) mode according to an aspect of the disclosure. In an aspect, such as in Enhanced Compression Model (ECM) software, the IntraTMP is a special intra prediction mode that can copy the best prediction block (e.g., a matching block (721)) from a reconstructed part of a current frame (or a current picture), where a template (e.g., an L-shaped template) (720) of the best prediction block can match a current template (710) of a current block (711) (e.g., a current PU or a current CU). For a predefined search range, an encoder can search for the most similar template to the current template in the reconstructed part of the current frame and can use the corresponding block as a prediction block. The encoder can signal the usage of the IntraTMP mode, and the same prediction operation can be performed at the decoder side.

The prediction signal can be generated by matching the current template (710), such as an L-shaped causal neighbor of the current block (711), with a template of another block in a predefined search area. An exemplary search area shown in FIG. 7 can include multiple CTUs (or superblocks). Referring to FIG. 7, the search area can include a current CTU R1 (e.g., a portion of the current CTU R1), a top-left CTU R2, an above CTU R3, and a left CTU R4. The cost function can include any suitable cost function, such as a sum of absolute differences (SAD).

Within each region, the decoder can search for a template that has the least cost (e.g., the least SAD) with respect to the current template and can use a block associated with the template having the least cost as a prediction block.

Dimensions of regions indicated by (SearchRange_w, SearchRange_h) can be set to be proportional to a block dimension (BlkW, BlkH) to have a fixed number of SAD comparisons per pixel. Thus, $$SearchRange\_w = a \times BlkW \quad \text{Eq. (1)}$$
$$SearchRange\_h = a \times BlkH \quad \text{Eq. (2)}$$

The parameter 'a' can be a constant that controls the trade-off between the gain and the complexity. In an example, 'a' is 5.

In an example, to speed-up the template matching process, the search range (e.g., the search range of all search regions) is subsampled by a factor of 2, which leads to a reduction of a template matching search by a factor of 4. After the best match (or an initial best match) is found, a refinement process can be performed. The refinement is done via a second template matching search around the best match (or the initial best match) with a reduced range. The reduced range is defined as min (BlkW, BlkH)/2.

The Intra template matching tool can be enabled for CUs with size less than or equal to 64 in width and height. The maximum CU size (e.g., 64) for intra template matching can be configurable.

The intra template matching prediction mode can be signaled at a CU level through a dedicated flag when a decoder-side intra mode derivation (DIMD) is not used for a current CU.

In an example, for an IntraTMP coded block, when selecting a primary transform, an implicit transform selection method can be applied: the horizontal transform type is DST7 if a block with is within 4 and 16; otherwise, the horizontal transform type is DCT2. The vertical transform type is DST7 if a block height is within 4 and 16; otherwise, the vertical transform type is DCT2. When selecting a secondary transform, the IntraTMP coded block (e.g., the IntraTMP mode) can be mapped to the Planar mode (e.g., the intra prediction mode Planar), and the secondary transform set associated with the Planar mode is applied for the IntraTMP coded block.

VVC also includes a Matrix-based intra prediction (MIP) mode. For predicting the samples of a rectangular block of width W and height H, MIP takes one line of H reconstructed neighbouring boundary samples that are located at left of the block, and one line of W reconstructed neighbouring boundary samples above the block as input. If the reconstructed samples are unavailable, they are generated as it is done in the conventional intra prediction.

The generation of the prediction signal is based on the following steps:
(a) Out of the boundary samples, four samples in the case of W=H=4 and eight samples in all other cases are extracted by averaging.
(b) A matrix vector multiplication, followed by addition of an offset, is carried out with the averaged samples as an input. The result is a reduced prediction signal on a subsampled set of samples in the original block.
(c) The prediction signal at the remaining positions is generated from the prediction signal on the subsampled set by linear interpolation which can be a single step linear interpolation in each direction.

The matrices and offset vectors used to generate the prediction signal can be taken from three sets $S_0$, $S_1$, $S_2$ of matrices. The set $S_0$ can include 18 matrices $A_0^i$, $i \in \{0, \ldots, 17\}$, and each of the matrices can have 16 rows, 4 columns and 18 offset vectors $b_0^i$, $i \in \{0, \ldots, 17\}$. Each of the offset vectors $b_0^i$ can have a size 16. Matrices and offset vectors of the set $S_0$ can be used for blocks of size 4×4. The set $S_1$ can include 10 matrices $A_1^i$, $i \in \{0, \ldots, 9\}$, each of the matrices can have 16 rows, 8 columns and 10 offset vectors $b_1^i$, $i \in \{0, \ldots, 9\}$. Each of the offset vectors $b_1^i$ can have a size 16. Matrices and offset vectors of the set $S_1$ can be used for blocks of sizes 4×8, 8×4 and 8×8. The set $S_2$ can include 6 matrices $A_2^i$, $i \in \{0, \ldots, 5\}$, each of the matrices can have 64 rows, 8 columns and 6 offset vectors $b_2^i$, $i \in \{0, \ldots, 5\}$ of size 64. Matrices and offset vectors of the set $S_2$ or parts of these matrices and offset vectors can be used for all other block-shapes.

Figure 8:
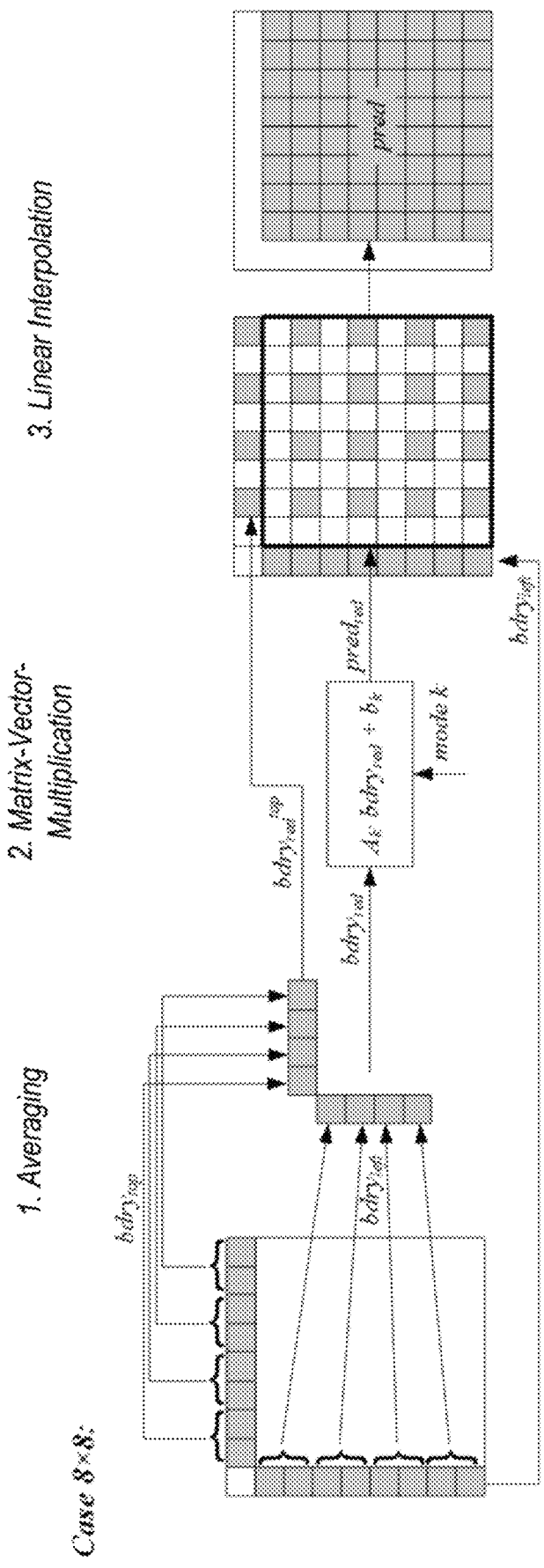
FIG. 8 shows an example of a Matrix-based intra prediction (MIP) mode according to an aspect of the disclosure.

FIG. 8 shows an example of MIP for an 8×8 block according to an aspect of the disclosure. For the 8×8 block, MIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, the samples are interpolated vertically by using the reduced top boundary. Horizontal interpolation follows by using the original left boundary. The interpolation process does not require any multiplications in this case.

In terms of signaling of MIP mode, for each CU in an intra mode, a flag indicating whether an MIP mode is applied on the corresponding PU or not is sent in the bitstream. If an MIP mode is applied, the index predmode of the MIP mode can be signaled using an MPM-list including 3 MPMs.

A Palette mode can be used in video coding. A palette mode can be used in in VCC and screen content coding (SCC) extension in HEVC. A Palette mode can be applied to code screen content, such as screen-captured content, computer-generated content, and/or the like. In an aspect, the screen content uses a smaller number of color values for samples inside a local area than non-screen content. Thus, the sample values in a palette-coded block can be mapped to a reduced set of colors, e.g., a palette table of a block, and each sample can be represented by an index into the palette table or an index that indicates an "escape" color. In the case of the "escape" color, quantized sample values can be directly coded.

A transform, such as a primary transform, a secondary transform, can be applied to a block. In an example, a transform includes a combination of a primary transform and a secondary transform. In an example, a transform includes a non-separable transform. In an example, a transform includes a separable transform.

A secondary transform can be performed such as in VVC. In some examples, such as in VVC, a low-frequency non-separable transform (LFNST) can be applied between a forward primary transform and quantization at an encoder side and between de-quantization and an inverse primary transform at a decoder side. A reduced secondary transform (RST) method can be used in the LFNST.

Application of a non-separable transform, which can be used in an LFNST, can be described as follows using a 4×4 input block (or an input matrix) X as an example (shown in Eq. (3)). To apply the 4×4 non-separable transform (e.g., the LFNST), the 4×4 input block X can be represented by a vector $\vec{X}$, as shown in Eqs. 3-4.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \qquad \text{Eq. (3)}$$

$$\vec{X}[X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T \qquad \text{Eq. (4)}$$

The non-separable transform can be calculated as $\vec{F} = T \cdot \vec{X}$, where $\vec{F}$ indicates a transform coefficient vector, and T is a 16×16 transform matrix. The 16×1 coefficient vector $\vec{F}$ can be subsequently reorganized into a 4×4 output block (or an output matrix, a coefficient block) using a scanning order (e.g., a horizontal scanning order, a vertical scanning order, a zigzag scanning order, or a diagonal scanning order) for the 4×4 input block. The transform coefficients with smaller indices can be placed with smaller scanning indices in the 4×4 coefficient block.

An LFNST transform (also referred to as a transform kernel, a transform core, or a transform matrix) can be selected as described below. In an embodiment, multiple transform sets can be used, and one or more non-separable transform matrices (or kernels) can be included in each of the multiple transform sets in the LFNST. A transform set can be selected from the multiple transform sets, and a non-separable transform matrix can be selected from the one or more non-separable transform matrices in the transform set.

Table 1 shows an exemplary mapping from intra prediction modes to the multiple transform sets according to an embodiment of the disclosure. The mapping indicates a relationship between the intra prediction modes and the multiple transform sets. The relationship, such as indicated in Table 1, can be pre-defined and can be stored in an encoder and a decoder.

TABLE 1

Transform set selection table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

Referring to Table 1, the multiple transform sets include four transform sets, e.g., transform sets 0 to 3 represented by a transform set index (e.g., Tr. set index) from 0 to 3, respectively. An index (e.g., an intra prediction mode index or an IntraPredMode) can indicate the intra prediction mode, and the transform set index can be obtained based on the index and Table 1. Accordingly, the transform set can be determined based on the intra prediction mode. In an example, if one of three cross component linear model (CCLM) modes (e.g., INTRA_LT_CCLM, INTRA_T_CCLM or INTRA_L_CCLM) is used for a current block (e.g., 81<=IntraPredMode<=83), the transform set 0 is selected for the current block.

As described above, each transform set can include the one or more non-separable transform matrices. One of the one or more non-separable transform matrices can be selected by an LFNST index that is, for example, explicitly signaled. The LFNST index can be signaled in a bitstream once per intra-coded CU, for example, after signaling transform coefficients. For each transform set, the selected non-separable secondary transform candidate can be specified by the explicitly signaled LFNST index.

In an embodiment, the LFNST is restricted to be applicable only if all coefficients outside the first coefficient subgroup are non-significant, coding of the LFNST index can depend on a position of the last significant coefficient. The LFNST index can be context coded. In an example, the context coding of the LFNST index does not depend on an intra prediction mode, and only a first bin is context coded. The LFNST can be applied to an intra-coded CU in an intra slice or in an inter slice, and for both Luma and Chroma components. If a dual tree is enabled, LFNST indices for Luma and Chroma components can be signaled separately. For an inter slice (e.g., the dual tree is disabled), a single LFNST index can be signaled and used for both the Luma and Chroma components.

Considering that a large CU greater than 64×64 is implicitly split (TU tiling) due to the existing maximum transform size restriction (e.g., 64×64), an LFNST index search can increase data buffering by four times for a certain number of decode pipeline stages. Therefore, in some examples, the maximum size that the LFNST is allowed is restricted to 64×64. In an example, the LFNST is enabled with DCT2 only. In an example, the LFNST index signaling is placed before an MTS index signaling.

In an example, the use of scaling matrices for perceptual quantization is not evident that the scaling matrices that are specified for the primary matrices may be useful for LFNST coefficients. Hence, in some examples, the uses of the scaling matrices for LFNST coefficients are not allowed. In an example, for a single-tree partition mode, a chroma LFNST is not applied.

In an aspect, such as in ECM, the LFNST design in VVC is extended as follows:

The number of LFNST sets (S) and candidates (C) are extended to S=35 and C=3, and the LFNST set (lfnstTrSetIdx) for a given intra mode (predModeIntra) is derived according to the following formula:

For $predModeIntra < 0$, $lfnstTrSetIdx$ is equal to 2

$lfnstTrSetIdx = predModeIntra$, for $predModeIntra$ in $[0, 34]$ $lfnstTrSetIdx = 68 - predModeIntra$, for $predModeIntra$ in $[35, 66]$ Three different kernels, LFNST4, LFNST8, and LFNST16, are defined to indicate LFNST kernel sets, which are applied to 4×N/N×4 (N≥4), 8×N/N×8 (N≥8), and M×N (M, N≥16), respectively.

FIG. 9 shows an example of the mapping from intra prediction modes to the secondary transform sets according to an aspect of the disclosure. As shown in FIG. 9, a table, such as Table 2, is used to indicate the mapping from the intra prediction modes (denoted as Intra pred. mode in Table 2) to the secondary transform sets, such as the LFNST sets indicated by respective LFNST set indices (denoted as lfnstTrSetIdx) in Table 2.

In related technologies, when applying a transform to IBC coded blocks or IntraTMP coded blocks, the same secondary transform set as applied to the Planar mode is applied. However, an IBC coded block or an IntraTMP coded block may have directionality, and thus sharing the same transform set as used for the Planar mode may be suboptimal. According to an aspect of the disclosure, a secondary transform set can be selected for an IBC coded block or an IntraTMP coded block based on characteristics (e.g., the directionality) of the respective IBC coded block or the IntraTMP coded block.

In the disclosure, a first plurality of prediction modes can include the IBC mode, the IntraTMP mode, the MIP mode, the Palette mode, and/or the like. The first plurality of prediction modes can be referred to as a first plurality of intra prediction modes in the disclosure for the following reasons: when a current block in a current picture is predicted using one of the first plurality of intra prediction modes (e.g., the IBC mode, the IntraTMP mode, the MIP mode, or the Palette mode), samples in the current block can be predicted using, for example, reference samples in the current picture. In an example, when the current block in the current picture is predicted using one of the first plurality of intra prediction modes (e.g., the IBC mode, the IntraTMP mode, the MIP mode, or the Palette mode), samples in the current block are predicted without using reference samples in another picture.

A second plurality of intra prediction modes can include the DC mode, the Planar, and the angular intra prediction modes, such as described with reference to FIGS. 4-5.

In an aspect, each of the second plurality of intra prediction modes is referred to as a conventional intra prediction mode (CIPM), such as illustrated in FIGS. 4-5. Each of the first plurality of intra prediction modes is referred to as an unconventional intra prediction mode (UIPM), such as illustrated in FIGS. 6-8. In an example, an intra prediction mode (e.g., a prediction mode that predicts the current block in the current picture using reference samples in the current picture) that is not included in the second plurality of intra prediction modes is referred as a first intra prediction mode in the first plurality of intra prediction modes or an UIPM. UIPMs can include but are not limited to the IBC mode, the IntraTMP mode, the MIP mode, and/or the Palette mode.

In an aspect, when the current block is coded with an intra prediction mode that is not in the second plurality of intra prediction modes, a second intra prediction mode in the second plurality of intra prediction modes (e.g., a CIPM, such as the Planar mode, the DC mode, or an angular intra prediction mode) can be determined and the second intra prediction mode can be associated with the current block.

According to an aspect of the disclosure, when the current block is coded with a first intra prediction mode in the first plurality of intra prediction modes (e.g., an UIPM), such as the IntraTMP mode, the IBC mode, the MIP mode, the Palette mode, or the like, a second intra prediction mode in the second plurality of intra prediction modes (e.g., a CIPM, such as the Planar mode, the DC mode, or an angular intra prediction mode) can be determined (e.g., derived) and the second intra prediction mode can be associated with the current block.

The second intra prediction mode associated with the current block may be used in constructing a most probable mode (MPM) list for another block (e.g., a neighboring block of the current block). The second intra prediction mode associated with the current block may be used in transform selection for the current block.

When the current block is coded by an unconventional intra prediction mode (UIPM), such as the IntraTMP mode, the IBC mode, the MIP mode, or the Palette mode, a conventional intra prediction mode (CIPM), such as one of the Planar mode, the DC mode, and/or angular intra prediction modes, is derived and is associated with the current block, and this associated intra mode (e.g., the CIPM) may be further used for the MPM list construction of neighboring blocks and the transform selection of current block.

In one aspect, only for a selected set of blocks coded by UIPM(s), a regular intra mode (e.g., a CIPM, such as an angular intra prediction mode) is derived and used for the MPM list construction of other blocks or the transform selection of current block. In an example, the selected set of blocks coded by the UIPM(s) are referred to as candidate blocks.

In one example, the selection of blocks (which are associated with an intra prediction mode) (e.g., the blocks can refer to the set of blocks coded by the UIPM(s)) depends on whether the blocks are located within a pre-defined region, such as the region covered by a current CTU and/or several previously coded CTUs. In an example, the pre-defined region includes one or more of (i) the current CTU and (ii) at least one previously coded CTU. In an example, the one or more of (i) the current CTU and (ii) at least one previously coded CTU include the pre-defined region.

In an aspect, the current block is coded with a first intra prediction mode (e.g., a UIPM) that is different from a plurality of intra prediction modes (e.g., the second plurality of intra prediction modes or the CIPMs) that includes the DC mode, the Planar mode, and the angular intra prediction modes. A candidate block (e.g., one of the selected set of blocks coded by the UIPM(s)) coded by an intra prediction mode (e.g., a UIPM) different from the plurality of intra prediction modes can be selected. In an example, the candidate block is selected when the candidate block is located within the pre-defined region. If the candidate block is located within the pre-defined region, a second intra prediction mode (e.g., a CIPM) can be derived from the plurality of intra prediction modes for the candidate block and the second intra prediction mode is associated with the candidate block.

The second intra prediction mode that is associated with the candidate block can be associated with the current block and can be used in (i) selecting a transform for the current block and/or (ii) constructing the MPM list for another block. At least one of: (i) selecting the transform for the current block based on the second intra prediction mode (e.g., the CIPM) associated with the current block and reconstructing the current block according to the selected transform and (ii) constructing the MPM list for the other block (e.g., one of other blocks) using the derived second intra prediction mode can be performed.

In one example, the selection of blocks (which are associated with an intra prediction mode) depends on whether the blocks are located within the pre-defined region and the predefined region is updated after every block is coded. In an example, the pre-defined region is updated for another block that is coded after the current block is coded.

In one example, the selection of blocks (which are associated with an intra prediction mode) depends on whether the blocks are located within the pre-defined region and the area size of the pre-defined region is a fixed value, e.g., N×64×64, or N×128×128. N can be a positive integer, such as 1, 2, 3, . . . , and the like. In an example, a size (e.g., a width, a height, or the area size) of the pre-defined region is fixed.

In another example, the second intra prediction mode (e.g., the CIPM) is derived for the current block coded with the first intra prediction mode (e.g., the UIPM) only when the current block is one of a selected set of blocks coded by UIPM(s). The selection of the blocks can depend on whether the blocks are located within a pre-defined region, such as the pre-defined region described above.

Figure 10:
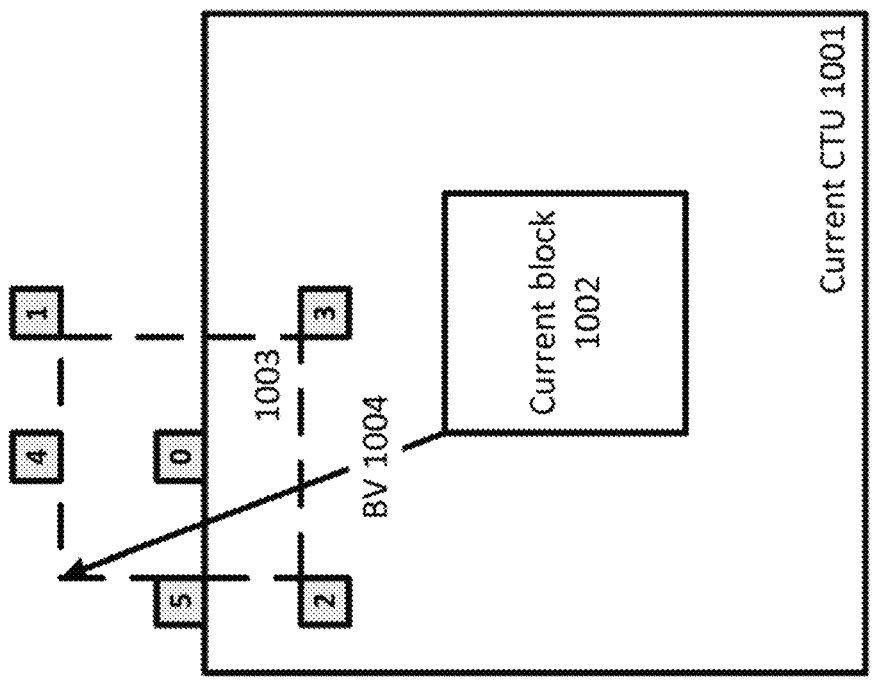
FIG. 10 shows an example of candidate block positions used to derive an intra prediction mode for a current block according to an aspect of the disclosure.

In another aspect, when deriving the CIPM for an IntraTMP coded block and/or an IBC coded block, given a block vector (BV) associated with the IntraTMP mode and/or the IBC mode, several candidate block positions are checked in a pre-defined order to fetch an intra prediction mode (e.g., a CIPM) in a reconstructed region. FIG. 10 shows an example of candidate block positions used to derive a CIPM for a current block (1002) according to an aspect of the disclosure. The current block (1002) is in a current CTU (1001). The current block (1002) can be coded with one of the IBC mode and the IntraTMP mode. A BV (1004) associated with the one of the IntraTMP mode and the IBC mode can indicate a reference block (1003). Candidate block positions 0-5 can be associated with the reference block (1003). In an example, the candidate block positions 0-5 are checked in a pre-defined order to obtain the CIPM.

In an aspect, the second intra prediction mode (e.g., the CIPM) associated with the current block (1002) (e.g., the IntraTMP coded block or the IBC coded block) can be derived from CIPMs (e.g., the plurality of intra prediction modes including the DC mode, the Planar mode, and the angular intra prediction modes) as follows: at least one candidate block position (e.g., the candidate block positions 0-5) can be checked in the pre-defined order. The at least one candidate block position can be associated with the reference block (1003) that is indicated by the BV (1004) associated with the one of the IBC mode and the IntraTMP mode. The second intra prediction mode (e.g., the CIPM) associated with the current block (1002) can be determined based on the at least one candidate block position, such as according to an intra prediction mode that is associated with one of the at least one candidate block position. At least one of: (i) selecting a transform for the current block (1002) based on the second intra prediction mode associated with the current block and reconstructing the current block (1002) according to the selected transform, or (ii) constructing an MPM list for another block using the derived second intra prediction mode associated with the current block (1002) can be performed.

In an example, the one (e.g., the candidate block position 2) of the at least one candidate block position (e.g., the candidate block positions 0-5) is associated with a CIPM, and the CIPM associated with the one (e.g., the candidate block position 2) of the at least one candidate block position can be determined as the second intra prediction mode associated with the current block (1002). In an example, a previously coded block includes a reconstructed sample that is located at the one of the at least one candidate block position and the previously coded block is coded with the CIPM, and thus the CIPM is associated with the one of the at least one candidate block position. In an example, a previously coded block includes a reconstructed sample that is located at the one of the at least one candidate block position and the previously coded block is coded with a UIPM, a CIPM associated with the previously coded block is derived, such as described in the disclosure. In an example, the CIPM associated with the previously coded block is associated with the one of the at least one candidate block position.

In an example, each of multiple positions in the at least one candidate block position is associated with a respective CIPM, and CIPMs associated with the multiple positions can be used to determine the second intra prediction mode associated with the current block (1002). In an example, one of the CIPMs associated with the multiple positions is determined as the second intra prediction mode associated with the current block (1002). In an example, a CIPM that is most frequently associated with the multiple positions can be determined as the second intra prediction mode associated with the current block (1002).

According to an aspect of the disclosure, when a first one of the at least one candidate block position does not have an associated intra prediction mode (e.g., a CIPM) that is one of the plurality of intra prediction modes, the first one of the at least one candidate block position can be skipped (e.g., without being checked). When the first one (e.g., the candidate block positions 0, 1, 4, or 5 in FIG. 10) of the at least one candidate block position (e.g., the candidate block positions 0-5) is located outside the pre-defined region (e.g., the current CTU (1001)) such as described above, the first one of the at least one candidate block position does not have the associated intra prediction mode (e.g., a CIPM) that is one of the plurality of intra prediction modes and can be skipped. Referring to FIG. 10, the candidate block positions 0, 1, 4, and 5 are located outside the pre-defined region (e.g., the current CTU (1001)), and thus the candidate block positions 0, 1, 4, and 5 are skipped. Accordingly, only the candidate block positions 2 and 3 are checked to obtain the CIPM for the current block (1002).

In one aspect, when a candidate block position does not have an associated CIPM, e.g., the candidate block position is outside the pre-defined region described above, then this candidate block position is skipped and a next candidate block position is checked to find a valid CIPM. For example, referring to FIG. 10, when the current block (1002) is coded by the IntraTMP mode (e.g., the one of the IntraTMP mode and the IBC mode) using the BV (1004), for example, derived by template matching, the reference block (1003) is identified by the BV (1004), and several candidate positions (indicated by shaded blocks labeled by 0, 1, . . . , 5 as an example) are checked in an order such as the pre-defined order (e.g., the order of 0 to 5). Since the positions (e.g., the candidate block positions) 0, 1, 4, 5 are outside the current CTU (e.g., the pre-defined region), only the positions 2 and 3 are checked to fetch the CIPM for the current block (1002).

Figure 11:
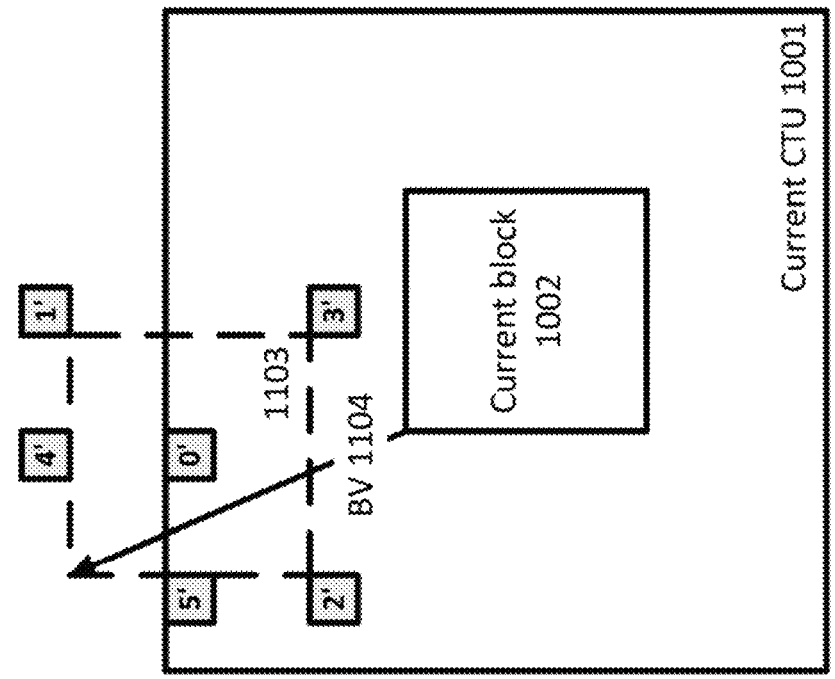
FIG. 11 shows an example of candidate block positions used to derive an intra prediction mode for a current block according to an aspect of the disclosure.

FIG. 11 shows an example of candidate block positions used to derive the CIPM for the current block (1002) according to an aspect of the disclosure. The current block (1002) and the current CTU (1001) in FIG. 11 are similar or identical to the current block (1002) and the current CTU (1001) described in FIG. 10. The current block (1002) can be coded with the one of the IBC mode and the IntraTMP mode. A BV (1104) associated with the one of the IntraTMP mode and the IBC mode can indicate a reference block (1103). Candidate block positions 0'-5' can be associated with the reference block (1103). According to an aspect of the disclosure, when a first one (e.g., the candidate block positions 4') of the at least one candidate block position (e.g., the candidate block positions 0'-5') is located outside the pre-defined region, the first one of the at least one candidate block position can be replaced with a position (e.g., the candidate block positions 0') inside the pre-defined region, such as shown in FIG. 11.

In an example, when a candidate block position (e.g., the candidate block positions 4') is outside the region (e.g., the pre-defined region), e.g., a reference block 4' (e.g., the candidate block positions 4' or a reference block associated with the candidate block positions 4') is outside the allowed region (e.g., the pre-defined region), operations can be processed such that a position (e.g., the candidate block positions 0') in the allowed region is used to replace it (e.g., the candidate block positions 4'). For this example, the reference block 0' (e.g., the candidate block positions 0' or a reference block associated with the candidate block positions 0') may be used to replace the reference block 4'.

In an aspect, the derived CIPM of the current block is stored in a buffer of the current picture P0. When another picture (P1) is using the current picture P0 as a reference picture, then this stored and derived intra mode (e.g., the derived CIPM) can be used to construct the MPM list of a block in the other picture P1. For example, the derived second intra prediction mode (e.g., the derived CIPM) is stored in the buffer of the current picture P0. When the current picture P0 is a reference picture of the other picture P1, the MPM list for the block in the other picture P1 is constructed using the stored second intra prediction mode. In an example, the derived second intra prediction mode (e.g., the derived CIPM) is stored in units of M×N. M and N are positive integers.

In an aspect, the derived CIPM is stored in units of M×N. Exemplary values of M and N can include, but are not limited to 8×4, 4×8, 8×8, and/or the like. For example, M×N can include, but are not limited to 8×4, 4×8, 8×8, and/or the like.

In an aspect, a transform set for the current block can be determined according to the derived second intra prediction mode (e.g., the derived CIPM). For example, the transform set for the current block is determined according to the derived second intra prediction mode (e.g., the derived CIPM) using mapping information or association information, such as a look-up table, that maps the second plurality of intra prediction modes to respective transform sets. In an example, the transform set for the current block is a secondary transform set. The mapping between the second plurality of intra prediction modes indicated by mode numbers (IntraPredMode) and the transform sets including low-frequency non-separable transform (LFNST) sets indicated by LFNST set indices (e.g., 0 to 3 in Table 1, 0 to 34 in Table 2) is shown in the look-up table, such as Table 1 or Table 2. When the transform set is determined, a transform can be selected from the determined transform set.

In an example, the transform to be selected is a secondary transform. In an example, a primary transform type is not selected based on the derived second intra prediction mode (e.g., the derived CIPM).

In an aspect, when selecting a transform type, the derived regular intra prediction mode (e.g., the derived CIPM) is only used for selecting a secondary transform, and the primary transform type is not selected based on the derived regular intra prediction mode.

Figure 12:
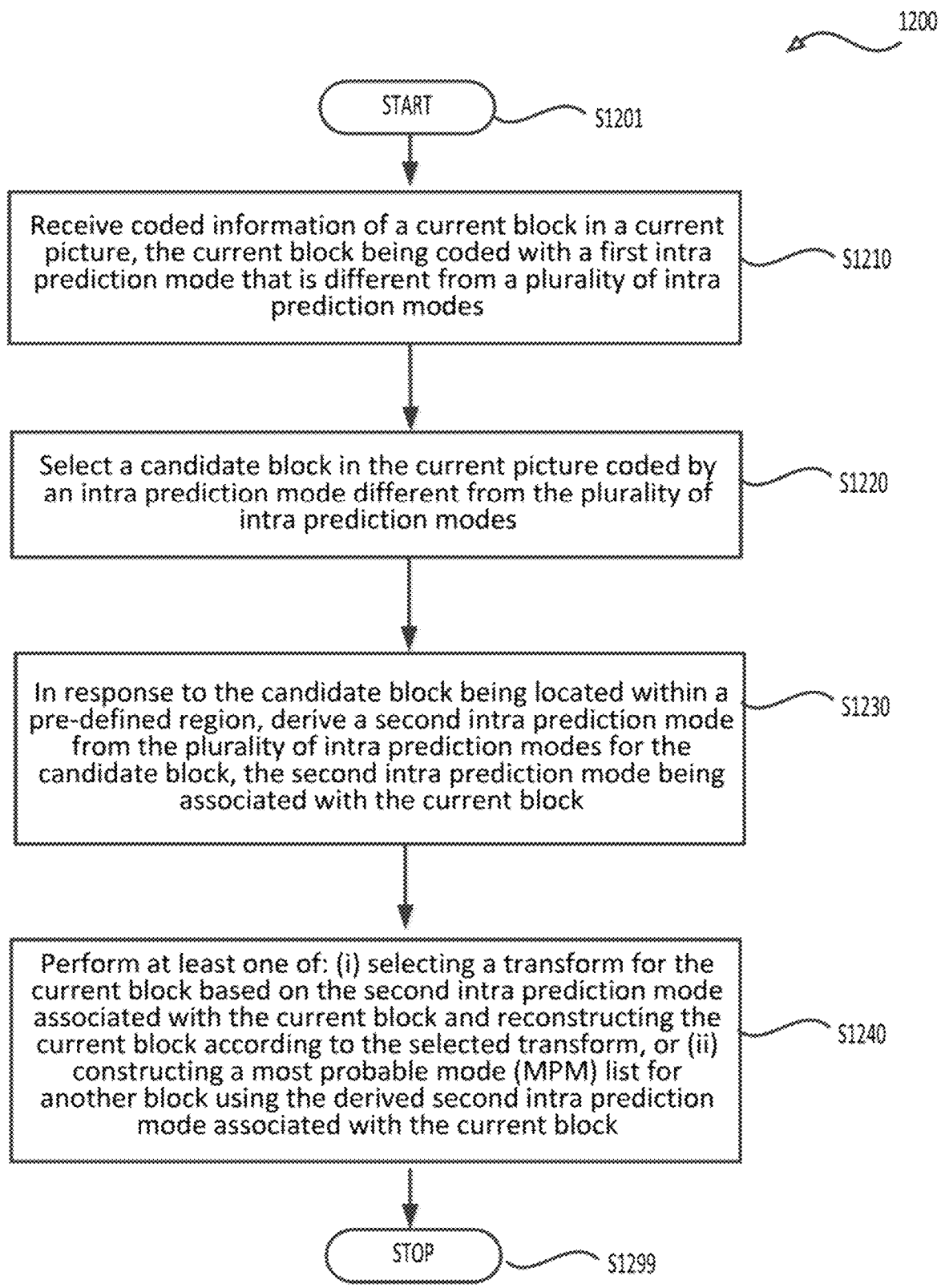
FIG. 12 shows a flow chart outlining a decoding process according to some aspect of the disclosure.

FIG. 12 shows a flow chart outlining a process (1200) according to an aspect of the disclosure. The process (1200) can be used in a video decoder. In various aspects, the process (1200) is executed by processing circuitry, such as the processing circuitry that performs functions of the video decoder (110), the processing circuitry that performs functions of the video decoder (210), and the like. In some aspects, the process (1200) is implemented in software instructions, thus when the processing circuitry executes the software instructions, the processing circuitry performs the process (1200). The process starts at (S1201) and proceeds to (S1210).

At (S1210), coded information of a current block in a current picture can be received. The current block can be coded with a first intra prediction mode that is different from a plurality of intra prediction modes including a DC mode, a Planar mode, and angular intra prediction modes.

In an example, the plurality of intra prediction modes is the second plurality of intra prediction modes. In an example, the plurality of intra prediction modes includes CIPMs.

In an example, the first intra prediction mode is one of the IBC mode, the IntraTMP mode, the MIP mode, and the Palette mode. In an example, the first intra prediction mode is one of the first plurality of intra prediction modes. In an example, the first intra prediction mode is a UIPM.

At (S1220), a candidate block in the current picture coded by an intra prediction mode (e.g., a UIPM) different from the plurality of intra prediction modes can be selected.

At (S1230), when the candidate block is located within a pre-defined region, such as described above, a second intra prediction mode (e.g., one of the second plurality of intra prediction modes or a CIPM) can be derived from the plurality of intra prediction modes for the candidate block. The second intra prediction mode can be associated with the current block.

In an example, the pre-defined region includes one or more of (i) a current coding tree unit (CTU) and (ii) at least one previously coded CTU.

In an example, the pre-defined region is updated for a block that is coded after the current block is coded.

In an example, a size of an area of the pre-defined region is fixed.

At (S1240), at least one of: (i) selecting a transform for the current block based on the second intra prediction mode associated with the current block and reconstructing the current block according to the selected transform, or (ii) constructing an MPM list for another block using the derived second intra prediction mode associated with the current block can be performed.

The transform that is a secondary transform is selected based on the derived second intra prediction mode, such as described above with reference to Tables 1-2. A primary transform type is not selected based on the derived second intra prediction mode.

In an example, the other block is a neighboring block of the current block.

In an example, the other block is a block in another picture that is different from the current picture.

Then, the process proceeds to (S1299) and terminates.

The process (1200) can be suitably adapted. Step(s) in the process (1200) can be modified and/or omitted. Additional step(s) can be added. Any suitable order of implementation can be used.

In an example, the derived second intra prediction mode is stored in a buffer of the current picture. When the current picture is a reference picture of another picture, the MPM list for the other block in the other picture can be constructed using the second intra prediction mode stored in the buffer of the current picture.

In an example, the derived second intra prediction mode is stored in units of M×N, such as described above. M and N can be positive integers.

Figure 13:
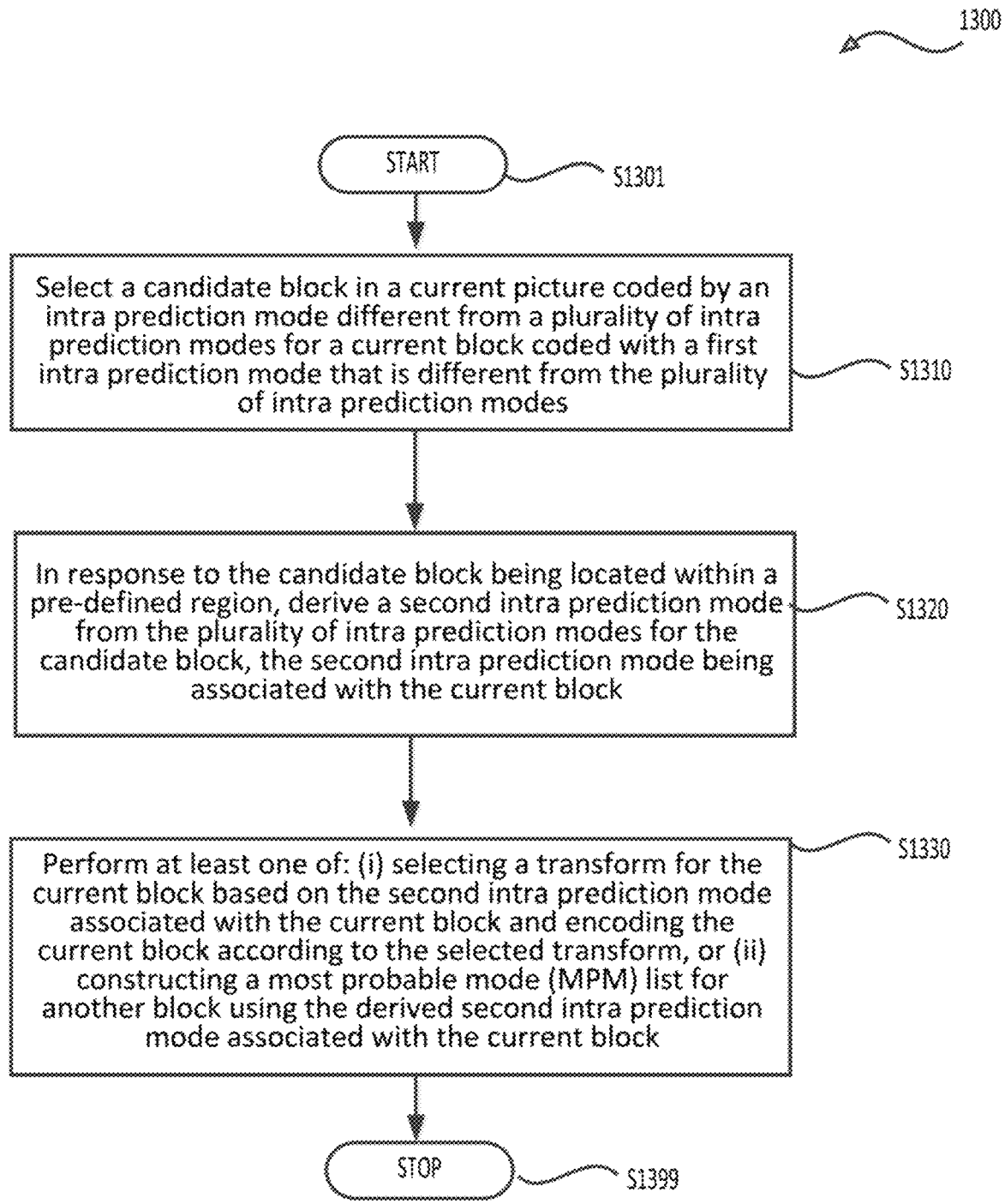
FIG. 13 shows a flow chart outlining an encoding process according to some aspect of the disclosure.

FIG. 13 shows a flow chart outlining a process (1300) according to an aspect of the disclosure. The process (1300) can be used in a video encoder. In various aspects, the process (1300) is executed by processing circuitry, such as the processing circuitry that performs functions of the video encoder (103), the processing circuitry that performs functions of the video encoder (303), and the like. In an aspect, the process (1300) is implemented in software instructions, thus when the processing circuitry executes the software instructions, the processing circuitry performs the process (1300). The process starts at (S1301) and proceeds to (S1310).

At (S1310), a candidate block in a current picture is selected for a current block in the current picture coded with a first intra prediction mode that is different from a plurality of intra prediction modes. The candidate block is coded by an intra prediction mode different from the plurality of intra prediction modes, such as described in FIG. 12.

At (S1320), when the candidate block is located within a pre-defined region, a second intra prediction mode can be derived from the plurality of intra prediction modes for the candidate block, such as described in (S1230). The second intra prediction mode can be associated with the current block.

At (S1330), at least one of: (i) selecting a transform for the current block based on the second intra prediction mode associated with the current block and reconstructing the current block according to the selected transform, or (ii) constructing an MPM list for another block using the derived second intra prediction mode associated with the current block can be performed, such as described in (S1240).

Then, the process proceeds to (S1399) and terminates.

The process (1300) can be suitably adapted. Step(s) in the process (1300) can be modified and/or omitted. Additional step(s) can be added. Any suitable order of implementation can be used.

Figure 14:
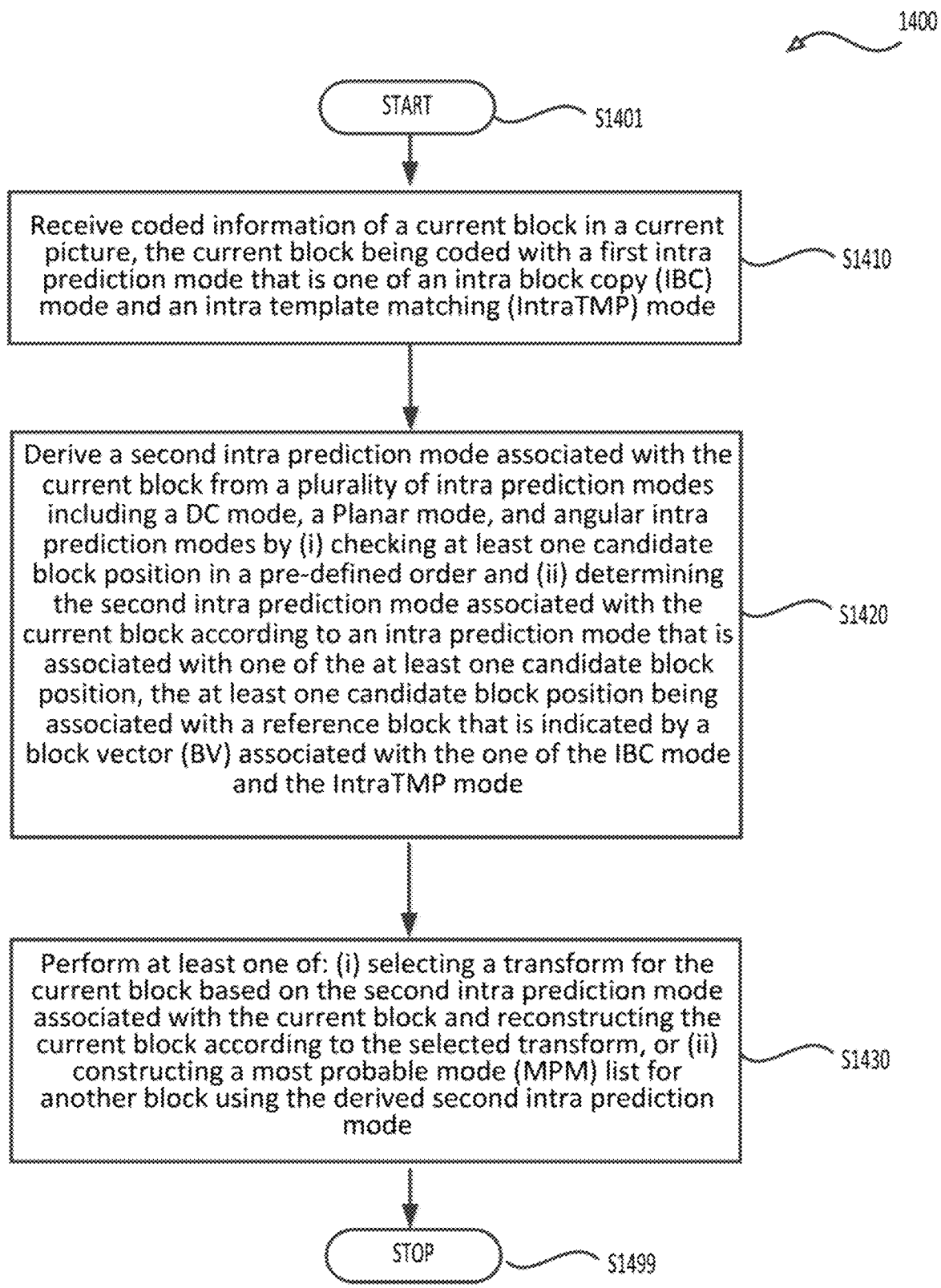
FIG. 14 shows a flow chart outlining a decoding process according to some aspect of the disclosure.

FIG. 14 shows a flow chart outlining a process (1400) according to an aspect of the disclosure. The process (1400) can be used in a video decoder. In various aspects, the process (1400) is executed by processing circuitry, such as the processing circuitry that performs functions of the video decoder (110), the processing circuitry that performs functions of the video decoder (210), and the like. In an aspect, the process (1400) is implemented in software instructions, thus when the processing circuitry executes the software instructions, the processing circuitry performs the process (1400). The process starts at (S1401) and proceeds to (S1410).

At (S1410), coded information of a current block in a current picture is received. The current block can be coded with a first intra prediction mode that is one of an intra block copy (IBC) mode and an intra template matching (IntraTMP) mode.

At (S1420), a second intra prediction mode (e.g., a CIPM) associated with the current block can be derived from a plurality of intra prediction modes (e.g., the second plurality of intra prediction modes) including a DC mode, a Planar mode, and angular intra prediction modes. For example, at least one candidate block position (e.g., one or more of the candidate block positions 0-5) is checked in a pre-defined order such as descried above. The at least one candidate block position can be associated with a reference block (e.g., the reference block (1003)) that is indicated by a BV (e.g., the BV (1004)) associated with the one of the IBC mode and the IntraTMP mode. The second intra prediction mode associated with the current block can be determined according to an intra prediction mode that is associated with one of the at least one candidate block position, such as described above (e.g., FIGS. 10-11).

In an example, when a first one of the at least one candidate block position does not have an associated intra prediction mode that is one of the plurality of intra prediction modes, the first one of the at least one candidate block position is skipped. For example, referring to FIG. 10, if the first one (e.g., the candidate block position 4) of the at least one candidate block position is located outside a pre-defined region (e.g., the CTU (1001)), the first one of the at least one candidate block position does not have the associated intra prediction mode that is one of the plurality of intra prediction modes.

In an example, the pre-defined region includes one or more of (i) a current coding tree unit (CTU) and (ii) at least one previously coded CTU.

In an example, the pre-defined region is updated for a block that is coded after the current block is coded.

In an example, a size of an area of the pre-defined region is fixed.

In an example, referring to FIG. 11, when the first one (e.g., the candidate block position 4') of the at least one candidate block position is located outside the pre-defined region (e.g., the CTU (1001)), the first one of the at least one candidate block position is replaced with a position (e.g., the candidate block position 0') inside the pre-defined region.

At (S1430), at least one of: (i) selecting a transform for the current block based on the second intra prediction mode associated with the current block and reconstructing the current block according to the selected transform, or (ii) constructing an MPM list for another block using the derived second intra prediction mode associated with the current block can be performed, such as described in (S1240).

The transform that is a secondary transform is selected based on the derived second intra prediction mode, such as described above with reference to Tables 1-2. A primary transform type is not selected based on the derived second intra prediction mode.

In an example, the other block is a neighboring block of the current block.

In an example, the other block is a block in another picture that is different from the current picture.

The process (1400) can be suitably adapted. Step(s) in the process (1400) can be modified and/or omitted. Additional step(s) can be added. Any suitable order of implementation can be used.

In an example, the derived second intra prediction mode is stored in a buffer of the current picture. When the current picture is a reference picture of another picture, the MPM list for the other block in the other picture can be constructed using the second intra prediction mode stored in the buffer of the current picture.

In an example, the derived second intra prediction mode is stored in units of M×N, such as described above. M and N can be positive integers.

Figure 15:
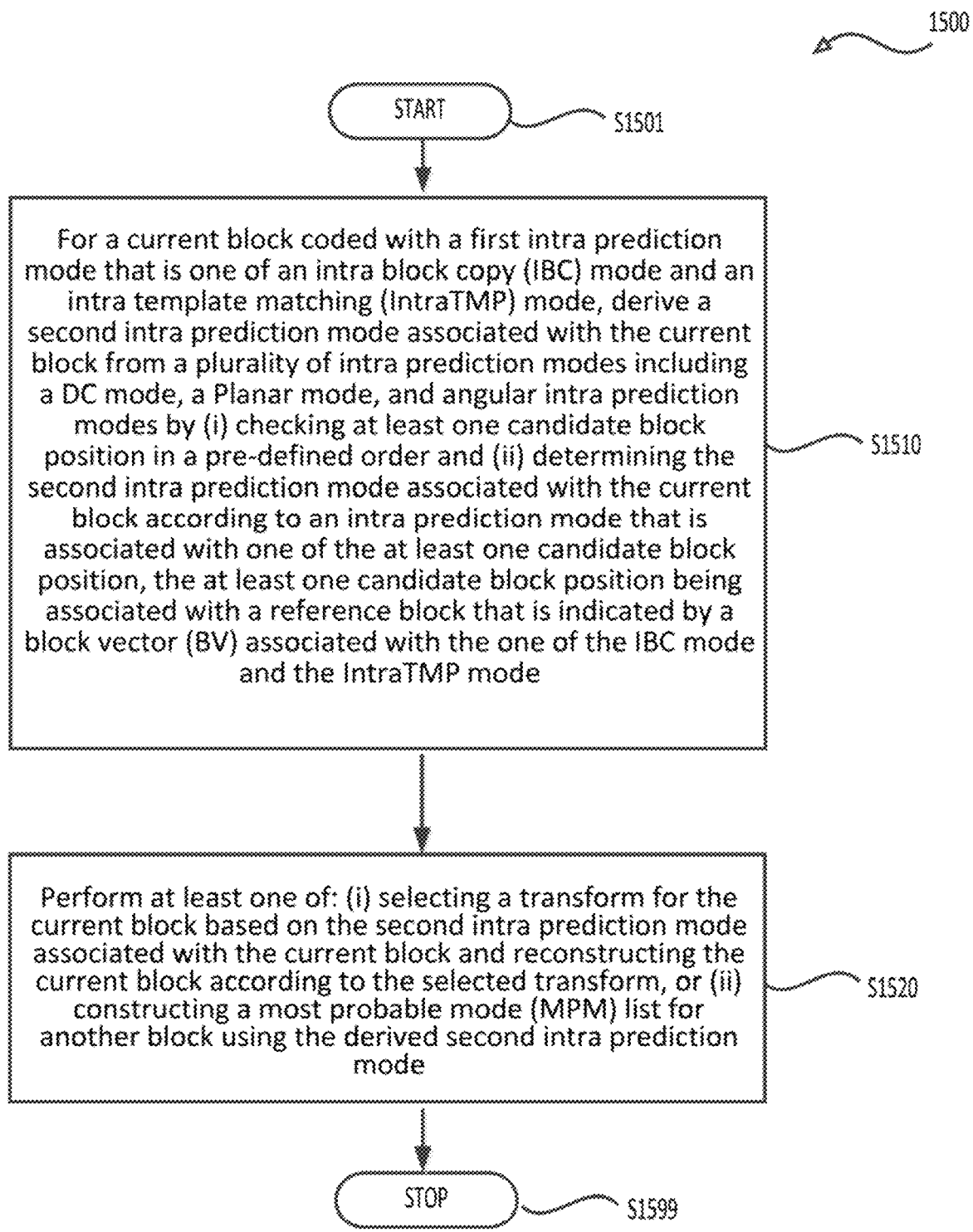
FIG. 15 shows a flow chart outlining an encoding process according to some aspect of the disclosure.

FIG. 15 shows a flow chart outlining a process (1500) according to an aspect of the disclosure. The process (1500) can be used in a video encoder. In various aspects, the process (1500) is executed by processing circuitry, such as the processing circuitry that performs functions of the video encoder (103), the processing circuitry that performs functions of the video encoder (303), and the like. In an aspect, the process (1500) is implemented in software instructions, thus when the processing circuitry executes the software instructions, the processing circuitry performs the process (1500). The process starts at (S1501) and proceeds to (S1510).

At (S1510), for a current block coded with a first intra prediction mode that is one of an intra block copy (IBC) mode and an intra template matching (IntraTMP) mode, a second intra prediction mode associated with the current block can be derived from a plurality of intra prediction modes including a DC mode, a Planar mode, and angular intra prediction modes, such as described in (S1420). For example, at least one candidate block position is checked in a pre-defined order. The second intra prediction mode associated with the current block is determined according to an intra prediction mode that is associated with one of the at least one candidate block position. The at least one candidate block position can be associated with a reference block that is indicated by a BV associated with the one of the IBC mode and the IntraTMP mode.

At (S1520), at least one of: (i) selecting a transform for the current block based on the second intra prediction mode associated with the current block and reconstructing the current block according to the selected transform, or (ii) constructing an MPM list for another block using the derived second intra prediction mode associated with the current block can be performed, such as described in (S1240).

Then, the process proceeds to (S1599) and terminates.

The process (1500) can be suitably adapted. Step(s) in the process (1500) can be modified and/or omitted. Additional step(s) can be added. Any suitable order of implementation can be used.

Aspects and/or examples in the disclosure may be used separately or combined in any order. Each of the methods (or aspects), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 16 shows a computer system (1600) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
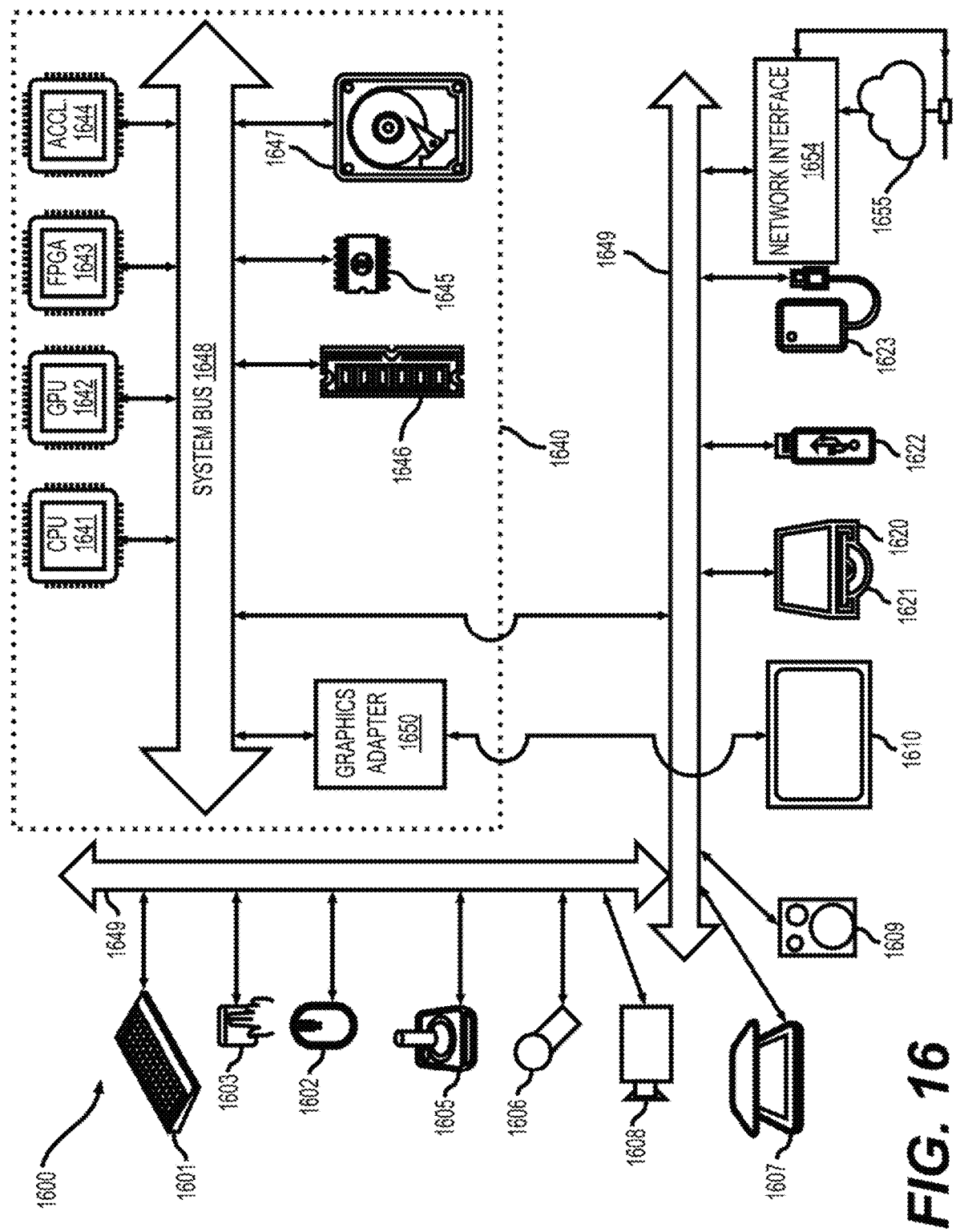
FIG. 16 is a schematic illustration of a computer system in accordance with an aspect.

The components shown in FIG. 16 for computer system (1600) are exemplary in nature and are not intended to suggest any limitation as to the scope of use or functionality of the computer software implementing aspects of the present disclosure. Neither should the configuration of components be interpreted as having any dependency or requirement relating to any one or combination of components illustrated in the exemplary aspect of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the screen (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various aspects of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
receiving coded information of a current block in a current picture, the current block being coded with a first intra prediction mode that is different from a plurality of intra prediction modes including a DC mode, a Planar mode, and angular intra prediction modes;
selecting a candidate block in the current picture coded by an intra prediction mode different from the plurality of intra prediction modes;
in response to the candidate block being located within a pre-defined region, deriving a second intra prediction mode from the plurality of intra prediction modes for the candidate block, the second intra prediction mode being associated with the current block; and
performing at least one of: (i) selecting a transform for the current block based on the second intra prediction mode associated with the current block and reconstructing the current block according to the selected transform, or (ii) constructing a most probable mode (MPM) list for another block using the derived second intra prediction mode associated with the current block.

2. The method of claim 1, wherein the pre-defined region includes one or more of (i) a current coding tree unit (CTU) and (ii) at least one previously coded CTU.

3. The method of claim 1, wherein the pre-defined region is updated for a block that is coded after the current block is coded.

4. The method of claim 1, wherein a size of an area of the pre-defined region is fixed.

5. The method of claim 1, further comprising:
storing the derived second intra prediction mode in a buffer of the current picture,
wherein the performing includes responsive to the current picture being a reference picture of another picture, constructing the MPM list for the other block in the other picture using the stored second intra prediction mode.

6. The method of claim 1, wherein the other block is a neighboring block of the current block.

7. The method of claim 1, further comprising:
storing the derived second intra prediction mode in units of M×N, M and N being positive integers.

8. The method of claim 1, wherein the performing comprises:
selecting the transform that is a secondary transform, a primary transform type not being selected based on the derived second intra prediction mode.

9. The method of claim 1, wherein the first intra prediction mode is one of an intra block copy (IBC) mode, an intra template matching (IntraTMP) mode, a Matrix-based intra prediction (MIP) mode, and a Palette mode.

10. A method of video decoding, comprising:
receiving coded information of a current block in a current picture, the current block being coded with a first intra prediction mode that is one of an intra block copy (IBC) mode and an intra template matching (IntraTMP) mode;
deriving a second intra prediction mode associated with the current block from a plurality of intra prediction modes including a DC mode, a Planar mode, and angular intra prediction modes by
checking at least one candidate block position in a pre-defined order, the at least one candidate block position being associated with a reference block that is indicated by a block vector (BV) associated with the one of the IBC mode and the IntraTMP mode; and
determining the second intra prediction mode associated with the current block according to an intra prediction mode that is associated with one of the at least one candidate block position; and performing at least one of: (i) selecting a transform for the current block based on the second intra prediction mode associated with the current block and reconstructing the current block according to the selected transform, or (ii) constructing a most probable mode (MPM) list for another block using the derived second intra prediction mode.

11. The method of claim 10, wherein the checking comprises:

in response to a first one of the at least one candidate block position not having an associated intra prediction mode that is one of the plurality of intra prediction modes, skipping the first one of the at least one candidate block position.

12. The method of claim 11, wherein in response to the first one of the at least one candidate block position being located outside a pre-defined region, the first one of the at least one candidate block position does not have the associated intra prediction mode that is one of the plurality of intra prediction modes.

13. The method of claim 12, wherein the pre-defined region includes one or more of (i) a current coding tree unit (CTU) and (ii) at least one previously coded CTU.

14. The method of claim 12, wherein the pre-defined region is updated for a block that is coded after the current block is coded.

15. The method of claim 10, wherein the checking comprises:

responsive to a first one of the at least one candidate block position being located outside a pre-defined region, replacing the first one of the at least one candidate block position with a position inside the pre-defined region.

16. The method of claim 15, wherein the pre-defined region includes one or more of (i) a current coding tree unit (CTU) and (ii) at least one previously coded CTU.

17. The method of claim 15, wherein the pre-defined region is updated for another block that is coded after the current block is coded.

18. The method of claim 10, further comprising:

storing the derived second intra prediction mode in a buffer of the current picture, wherein the performing includes responsive to the current picture being a reference picture of another picture, constructing the MPM list for the other block in the other picture using the stored second intra prediction mode.

19. The method of claim 10, further comprising:

storing the derived second intra prediction mode in units of M×N, M and N being positive integers.

20. The method of claim 10, wherein the performing comprises:

selecting the transform that is a secondary transform, a primary transform type not being selected based on the derived second intra prediction mode.

* * * * *